United States Patent [19]

Inoue et al.

[11] Patent Number: 5,270,876
[45] Date of Patent: Dec. 14, 1993

[54] APPARATUS FOR REPRODUCING DATA RECORDED ON A MAGNETIC RECORDING MEDIUM

[75] Inventors: Hajime Inoue, Tokyo; Takahito Seki; Keiji Kanota, both of Kanagawa, all of Japan

[73] Assignee: Sony Corporation, Tokyo, Japan

[21] Appl. No.: 482,302

[22] Filed: Feb. 20, 1990

[30] Foreign Application Priority Data

Feb. 28, 1989 [JP] Japan .................. 1-47793
May 31, 1989 [JP] Japan .................. 1-139654

[51] Int. Cl.$^5$ ............... G11B 5/09; G11B 5/035
[52] U.S. Cl. ..................... 360/46; 360/40; 360/65
[58] Field of Search .......... 360/32, 46, 65, 40; 375/18, 101, 102

[56] References Cited

U.S. PATENT DOCUMENTS

| | | | |
|---|---|---|---|
| 4,321,618 | 3/1982 | Hirose et al. | 358/8 |
| 4,750,058 | 6/1988 | Hirt et al. | 360/67 |
| 4,991,034 | 2/1991 | Sato | 360/32 |
| 5,095,392 | 3/1992 | Shimazaki et al. | 360/32 |

OTHER PUBLICATIONS

SMPTE Journal vol. 97, No. 1, Jan. 1988, US. pp. 8-12; S. Mita et al.: Adaptive equalization techniques for digital video recording systems p. 8, left column, line 1-right column, line 23; FIGS. 1-3.
IEEE Transactions on Consumer Electronics vol. 34, No. 3, Aug. 1988, New York U.S. pp. 4343-4441; Y. Kubo et al.: Development of a VTR video signal processing IC, paragraph 3; FIGS. 1-3.
IEEE Transactions on Consumer Electronics vol. 34, No. 3, Aug. 1988, New York U.S. pp. 588-595; C. Yamamitsu et al.: An experimental study on bit rate reduction and high density recording for a home-use digital VTR, paragraph 3C paragraph 30; FIGS. 2-5.
Patent Abstracts of Japan vol. 11, No. 359 (E-559) Nov. 21, 1987 & JP-A-62 135 018 (Masaru et al.) Jun. 18, 1987.
IBM Journal of Research and Development vol. 14, No. 4, Jul. 1970, New York US pp. 368-375; H. Kobayashi et al.: Application of partial-response channel coding to magnetic recording systems.

*Primary Examiner*—Donald T. Hajec
*Assistant Examiner*—Won Tae C. Kim
*Attorney, Agent, or Firm*—William S. Frommer; Alvin Sinderbrand

[57] ABSTRACT

A magnetic recording and/or reproducing device uses a Viterbi decoding circuit wherein, when data falls within a predetermined range, the level of the reproduced signal is sensed and the level of the reproduced signal is corrected in a manner which reduces bit error caused by noise in the reproduced signal. Alternatively, the value of a previous video signal value is corrected in accordance with the amount of change in an instant signal value.

5 Claims, 12 Drawing Sheets

| PRE-CODE DATA $D_{PR}$ | $b_{n-2}$ | $b_{n-1}$ | $b_n$ | $b_{n+1}$ | $b_{n+2}$ | $b_{n+3}$ |
|---|---|---|---|---|---|---|
| $D^2$ | $b_{n-4}$ | $b_{n-3}$ | $b_{n-2}$ | $b_{n-1}$ | $b_n$ | $b_{n+1}$ |
| OUTPUT SIGNAL $S_F$ | $b_{n-2}$ $-b_{n-4}$ | $b_{n-1}$ $-b_{n-3}$ | $b_n$ $-b_{n-2}$ | $b_{n+1}$ $-b_{n-1}$ | $b_{n+2}$ $-b_n$ | $b_{n+3}$ $-b_{n+1}$ |

FIG. 8

| PRE-CODE DATA $D_{PR}$ | $b_{n-2}$ | $b_n$ | $b_{n+2}$ | $b_{n+4}$ |
|---|---|---|---|---|
| $D$ | $b_{n-4}$ | $b_{n-2}$ | $b_n$ | $b_{n+2}$ |
| OUTPUT SIGNAL $S_F$ | $b_{n-2}$ $-b_{n-4}$ | $b_n$ $-b_{n-2}$ | $b_{n+2}$ $-b_n$ | $b_{n+4}$ $-b_{n+2}$ |

FIG. 9

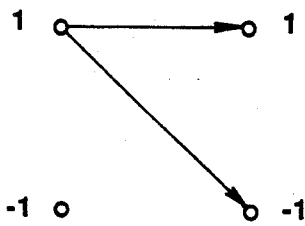 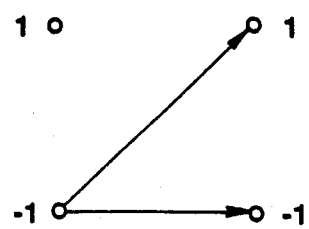 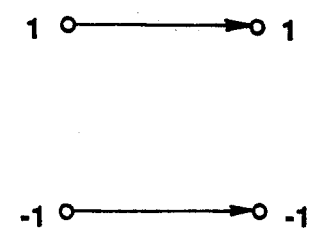
FIG.15  FIG.16  FIG.17
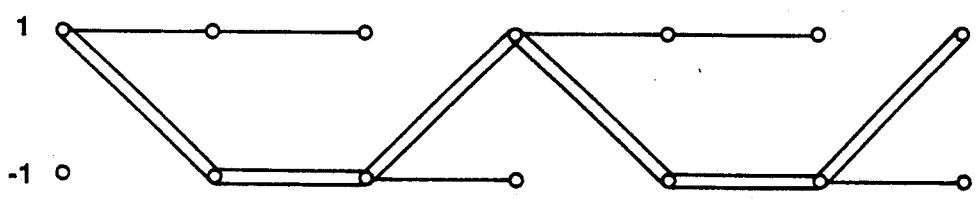
PRE-CODE DATA TRELLIS
FIG.18

APPARATUS FOR REPRODUCING DATA RECORDED ON A MAGNETIC RECORDING MEDIUM

BACKGROUND OF THE INVENTION

1. Field of the Invention

The present invention relates generally to a device for reproducing magnetically recorded data and more specifically is directed to an apparatus for reproducing video signals which have been digitized.

2. Description of the Prior Art

In currently used types of video recording apparatus, the video signal is frequency modulated and then recorded as an analog signal on magnetic tape.

However, in the case where the video signal is converted into a digital signal prior to recording, it is possible to repeatedly dub or copy the recorded signals without incurring any deterioration in the characteristics thereof.

As shown in FIG. 4, when a signal is reproduced from a magnetic tape, the magnetic head, the tape and the like of the electromagnetic transducing system exhibit characteristics which, in the low frequency and high frequency regions, cause reduction in the S/N ratio.

Accordingly, depending on the reproducing system, in order to obtain the desired S/N value, a digitized video signal (hereinafter referred to as a digital signal) may be limited to a narrow frequency range. Therefore, it is necessary to use a recording system by which the frequency spectrum enables the S/N ratio to approach its maximum value.

In order to achieve the above, a method has been proposed wherein the digital signal is recorded by means of a single detection class IV type partial response technique. In other words, as the S/N ratio deteriorates at high and low frequencies, it is possible to use a delay operator D value in the form of a class IV partial response $(1-D^2)$ in a manner to proximate the frequency characteristics $H(\omega)$, as shown on FIG. 5.

A video recorder, which has been proposed in order to take advantage of the fact that digital video signals can be dubbed without undergoing any deterioration, is shown on FIG. 19. In this arrangement, predetermined recording data $D_{REC}$ is supplied via an amplifier 3 to a magnetic recording head 4 and recorded thereby on magnetic tape 5. During reproduction, a magnetic playback head 6 is used to reproduce a signal $S_{RF}$ which is supplied through an amplifier 8 and an equalizing circuit 9 to a decoding circuit 10.

A clock signal Sck is produced by a clock signal generator 12 and supplied to the decoding circuit 10. The decoding circuit 10 responds thereto by checking the level of the reproduced signal $S_{RF}$ with respect to a predetermined reference value, at a predetermined timing, and outputting reproduction characteristic data $D_{RB}$ which is then used to decode the digitized video signal.

However, with this arrangement as a result of the movement of the tape and the inherent characteristics of the reproduction system, fluctuations in the level of the signal $S_{RF}$ cannot be avoided.

If an automatic compensation circuit is provided to correct the level of the signal $S_{RF}$, a slice level value in the decoding circuit 10 may become variable and it then becomes necessary to prevent bit error from appearing in the reproduction characteristic data.

However, with the above described method, in the event that noise is contained in the reproduced signal, bit error inevitably occurs.

OBJECTS AND SUMMARY OF THE INVENTION

Accordingly, it is an object of the present invention to provide a circuit arrangement which can produce a playback or reproduced signal having a minimum amount of bit error which tends to occur due to noise and the like.

In accordance with an aspect of this invention, there is provided an arrangement having a Viterbi decoding circuit in which, when data falls within a predetermined range, the level of the reproduced signal is sensed and the level of the reproduced signal is corrected in a manner which reduces bit error caused by noise in the reproduced signal.

In accordance with another aspect of this invention a device for reproducing magnetic recordings features means for recording data on a recording media and for obtaining a reproduced signal therefrom and means for correcting a previous input data value in response to change in an instant input data value.

In accordance with still another aspect of this invention, a system for recording and reproducing data comprises means for converting an input signal from analog form into digital data; a moving body on which the digital data can be recorded; means for reading the data recorded on the moving body and producing an analog playback signal indicative thereof; means for converting the analog playback signal into a digital playback signal; signal dividing means for separating the digital playback signal into first and second signal portions; first and second Viterbi decoding circuits which respectively receive the first and second signal portions; signal re-combining means for receiving the outputs of the first and second Viterbi decoding circuits and forming a reconstituted digital signal; means for converting the reconstituted digital into an analog output signal; and means associated with the first and second Viterbi decoding circuits for modifying either the output of, or the signal which is input to the first and second viterbi circuits to reduce the bit error in the output of the first and second Viterbi circuits.

The above, and other objects, features and advantages of this invention, will be apparent in the following detailed description of preferred embodiments thereof which is to be read in connection with the accompanying drawings wherein corresponding components are identified by the same reference numerals in the several views.

BRIEF DESCRIPTION OF THE DRAWINGS

FIGS. 8 and 9 are diagrams which illustrate the operation of viterbi decoding circuits used in the embodiment of the present invention shown on FIG. 1;

FIGS. 13 to 18 are diagrams which illustrate operation of the Viterbi decoding circuit;

DETAILED DESCRIPTION OF THE PREFERRED EMBODIMENTS

Figure 1:
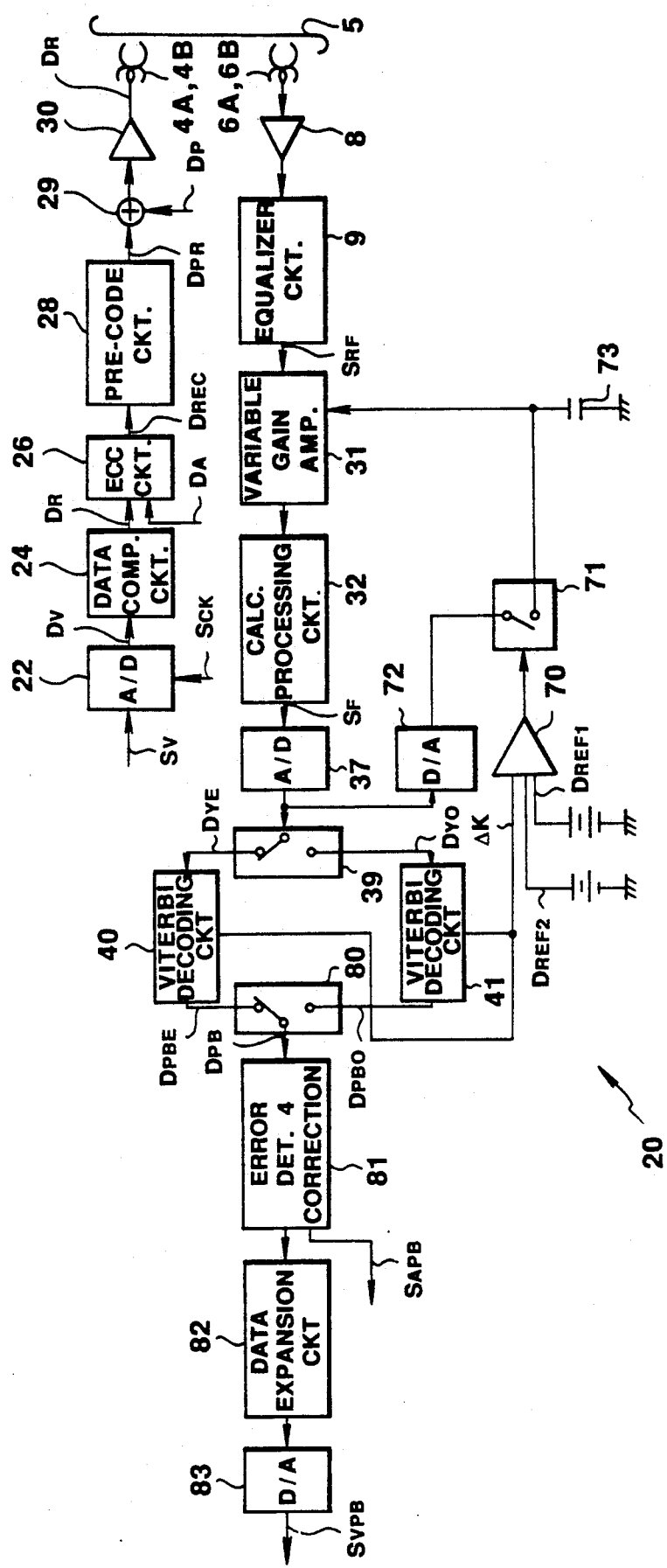
FIG. 1 is a block diagram showing a video tape recording device according to a first embodiment of the present invention.

Referring initially to FIG. 1, it will be seen that a recording and/or reproducing device 20 according to an embodiment of this invention comprises a recording section having an A/D converter 22, a data compression circuit 24, an error correction circuit 26, a pre-coding circuit 28, an adder 29, an amplifier 30 and recording heads 4A and 4B which are serially connected.

The device 20 further comprises a playback section which includes an amplifier 8, an equalizer circuit 9, a variable gain amplifier 31, a calculation processing circuit 32 and an A/D converter 37 which are also serially connected. A first selection or switching circuit 39 is connected to the output of the A/D converter 37 and is arranged to selectively switch between first and second Viterbi decoding circuits 40 and 41. The outputs of the Viterbi circuits 40 and 41 are connected with a second selection or switching circuit 80 which selectively channels data from the Viterbi circuits 40 and 41 to a series circuit of an error detection and correction circuit 81, a data expansion circuit 82 and a D/A converter 83.

A comparator 70 has one of its three inputs connected to terminals of the Viterbi circuits 40 and 41 from which data ΔK are output. The other two inputs of the comparator 70 are connected to sources of reference voltages $D_{REF1}$ and $D_{REF2}$, respectively. The output of the comparator 70 is connected to a switch circuit 71, which, as shown, is responsive to the output of the comparator 70 to selectively connect or disconnect an output of a D/A circuit 72 with respect to a gain-control input of the variable gain amplifier 31. The input of the D/A circuit 72 is connected with the output of the A/D converter 37. A sample and hold condenser 73 is connected between ground and the output terminal of the switch circuit 71.

In the above described arrangement, the A/D converter 22 receives an input video signal $S_v$ and is operated in accordance with a clock signal Sck so as to output an 8 bit digital signal $D_v$ each four clock pulses. The data compression circuit 24 receives the output $D_v$ of the A/D converter and outputs a data signal $D_R$ which is compressed to about 25 [Mbps], and than supplied to the error correction circuit (ECC) 26.

The ECC circuit 26 is arranged to also receive an audio signal $D_A$ in synchronism with the compressed digital signal $D_R$, and shuffles and corrects the received signals prior to outputting a recording data signal $D_{REC}$ (FIG. 2A) of approximately 30 [Mbps].

Figure 3:
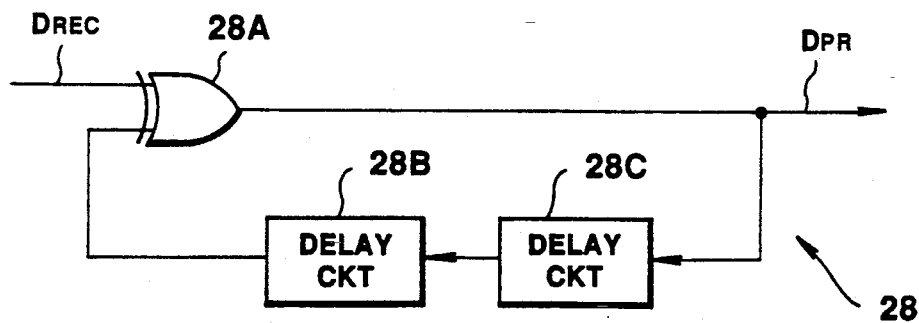
FIG. 3 is a circuit diagram showing details of a precoding circuit used in the device of FIG. 1.

As shown in FIG. 3, the pre-coding circuit 28 may include an exclusive or gate 28A arranged to receive the recording data signal $D_{REC}$ and to output a signal in accordance with a recording clock. Two serially connected delay circuits 28B and 28C are arranged in a feedback loop which connects the output of the exclusive or gate 28A with one of its inputs.

The pre-coding circuit 28 processes the recording data $D_{REC}$ in accordance with the following equation:

$$\left[\frac{1}{1-D^2}\right] MOD2 \tag{1}$$

Figure 2:
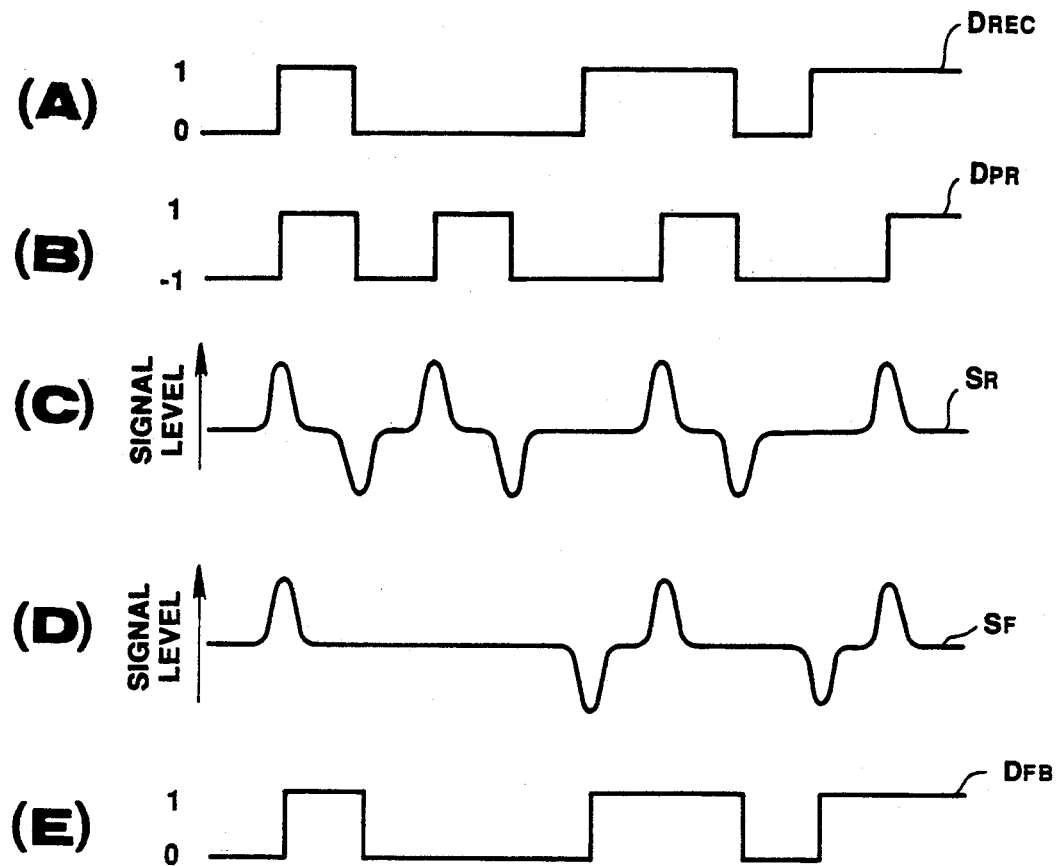
FIGS. 2(A)–2(E) are timing charts showing the waveforms of various signals which are produced in the circuit arrangement shown in FIG. 1.

When the value of $D_{REC}$ is between 1 and 0, the changing pre-coding data $D_{PR}$ from the circuit 28 varies as shown in FIG. 2B. In this instance, MOD2 is a surplus of 2.

Figure 4:
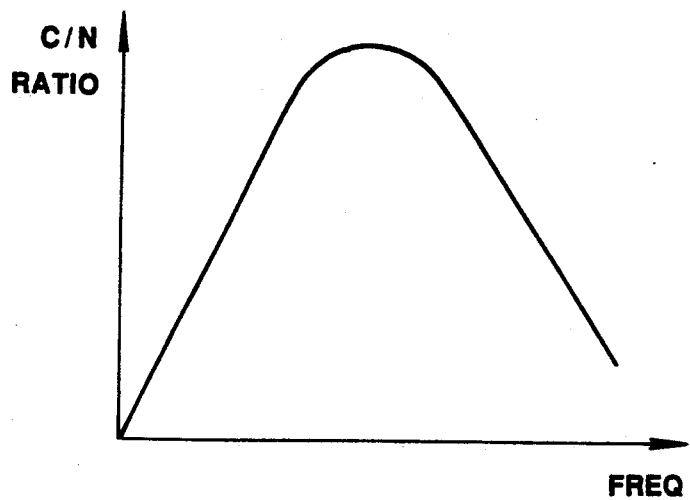
FIG. 4 is a graph showing, in terms of S/N ratio and frequency, the frequency dependency of the reproduction characteristics.

Accordingly, as shown in FIG. 4, when a signal is reproduced from a magnetic tape, the magnetic heads and other elements of the electromagnetic transducer system exhibit differential characteristics at low frequencies so that the signal-to-noise S/N ratio drops off markedly and, due to the magnetic characteristics of the tape, the S/N ratio also deteriorates rapidly in the high frequency region. This, of course, limits the frequency range in which a digitized signal, more specifically a digitized video signal, can be reproduced with a suitably high S/N ratio.

In this connection, it has been proposed to concentrate the frequency spectrum in a range which proximates that at which the S/N ratio is maximized so as to increase the efficiency of the reproduction. In this embodiment, the so called class IV partial response technique is employed in the reproduction of the video signals for that purpose. More specifically, as the S/N ratio deteriorates at high and low frequencies, it is possible as shown in FIG. 5, to employ a delay operator D in the form of a class IV partial response $(1-D^2)$ in a manner to proximate the frequency characteristics $H(\omega)$.

Figure 5:
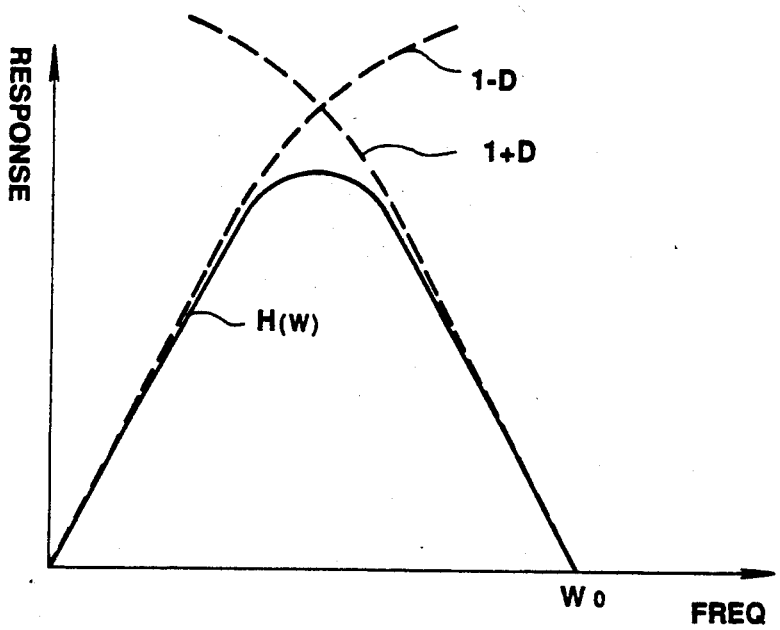
FIG. 5 is a graph which demonstrates, in terms of response and frequency, the technique which underlies the Class IV partial response method.

In such case, the minimum response frequencies $\omega_o$ are given by:

$$\omega_o = \frac{\pi}{T} \tag{2}$$

wherein T is the delay time of the operator D and $\omega_o$ is the upper frequency at which the response assumes a minimal value (FIG. 5).

Accordingly, by suitably selecting the value of D (the delay value), the spectrum can be concentrated at the frequencies at which the S/N ratio is maximized.

The overall transmission frequency is given by:

$$(1-D) \times (1-D) = 1-D^2 \tag{3}$$

Accordingly, by setting the transmission function to 1, the calculation control within the pre-coding circuit 28 can be executed in a manner which improves the efficiency of the reproduction.

Figure 6:
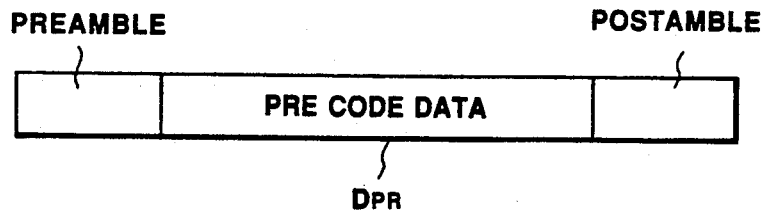
FIG. 6 is a diagram showing the arrangement of data used in the device of FIG. 1.

FIG. 6 shows that, in a block of pre-coded data $D_{PR}$ from the circuit 28, the pre-coded data is sandwiched between a preamble and a postamble. In connection with this data formation with a 0,1 connection, the precoded data $D_{PR}$ is, by the amplifier 30, converted to recording signal data $D_R$ having for example, $-1, 1$ values, and is written onto the tape 5.

The magnetic heads 4A, 4B are arranged on a rotatable drum (not shown) at diametrically opposed locations. In accordance with the preamble and postamble data, these heads write the data, in the form of a single block unit, on the tape wrapped around the drum.

The preamble is such that the recorded block is recorded at half the frequency (viz., 15 MHz) of the $D_{PR}$ signal which is compressed in a manner to have a frequency of about 30 Mhz, and is used as a reference signal. The frequency of this reference signal is of course selected in accordance with the values of $\omega_o$ obtained from equation (2).

In the present embodiment, the preamble is used as a clock signal which determines the control of the playback signal $S_{RF}$ from the equalizer circuit 9.

Figure 7:
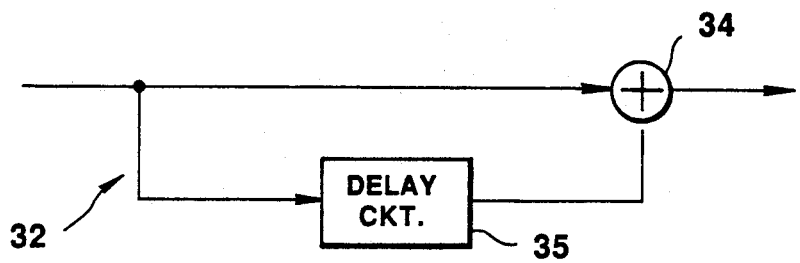
FIG. 7 is a block diagram showing details of a calculation processing circuit utilized in the device shown in FIG. 1.

Magnetic heads 6A and 6B which alternately scan the tape 5 are arranged to respond to the preamble and postamble data and to read the recorded data and output a playback signal $S_R$ (FIG. 2C). This signal $S_R$ is supplied through the amplifier 8, equalizer circuit 9 and variable gain amplifier 31 to the calculation or processing circuit 32. As shown in FIG. 7, the processing circuit 32 may comprise an adder circuit 34 and a delay circuit 35. In this arrangement, the signal $S_{RF}$ from the equalizer circuit 9 is processed with respect to $(1+D)$. As a result of the foregoing, and as the electromagnetic reproduction or playback system exhibits differential characteristics so that the signal $S_{RF}$ has the delay operator D applied thereto in the form of $(1-D)$, the effect shown in FIG. 5 is obtained.

Accordingly, for the purpose of accommodating the reproduction characteristics, at the time of recording of the pre-coded data, correction is effected in accordance with equation (3) and the efficiency of the recording of the video signal is improved.

Due to the provision of the processing circuit 32, the amplitude of the output signal $S_F$ (FIG. 2D) therefrom can be varied in accordance with the logic level.

The A/D circuit 37 receives the signal $S_F$ in accordance with the reproduction clock and converts the signal $S_F$ into digital data Yk output to the selection circuit 39.

The selection circuit 39 switches from one terminal to the other so that the output data Yk is selectively outputted from circuit 39 as even number data $D_{YE}$ and odd number data $D_{YO}$ which are respectively supplied to the Viterbi decoding circuits 40 and 41.

As shown in FIGS. 8 and 9, the processing of signal $S_{RF}$ with respect to $(1-D^2)$ is such that serial values bn, bn+1 ... represent the recording signal $D_R$ at a doubled clock pulse frequency used to divide the odd number frequency and even number frequency data Yk input to the selection circuit 39 and renders it possible to process the odd and even number frequency data with respect to $(1-D)$.

Figures 10, 11:
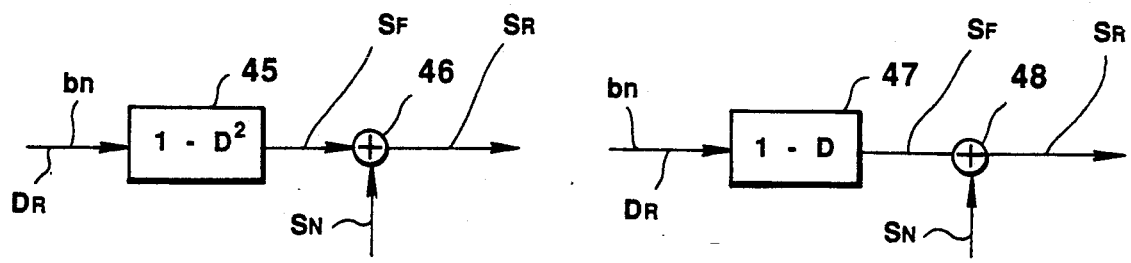
FIGS. 10 and 11 are block diagrams showing equivalence circuits used in electromagnetic recording/reproducing systems embodying this invention.

By reason of the foregoing, when noise $S_N$ enters the electromagnetic reproduction system, for example, through the magnetic heads 4A, 4B, 6A and 6B and the magnetic tape 5, as shown in FIG. 10, it is possible to process the recording signal $D_R$ with respect to $(1-D^2)$ in a processing circuit 45 so as to form an output signal $S_F$ which may be equivalently written together with the noise signal $S_N$ as an output signal $S_R$ from an adder circuit 46.

When the signal $S_F$ is divided into odd number and even number frequency streams, it is possible to process the recording signal $D_R$ with respect to $(1-D)$ in a processing circuit 47 (FIG. 11) so as to form an output signal $S_F$ which may be equivalently written with a noise signal $S_N$ as an output signal $S_R$ from an adder circuit 48.

Figure 13:
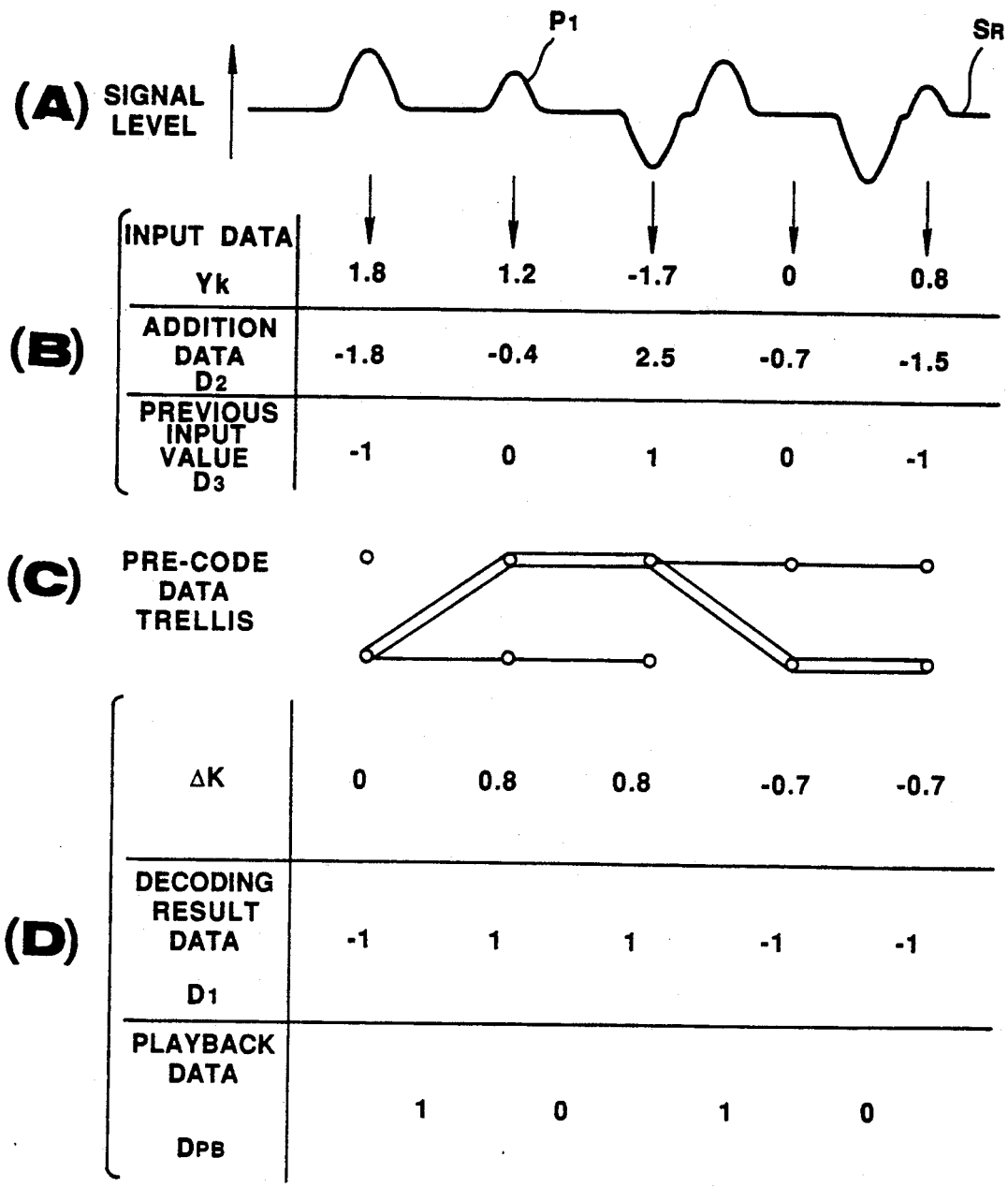
Figure 14:
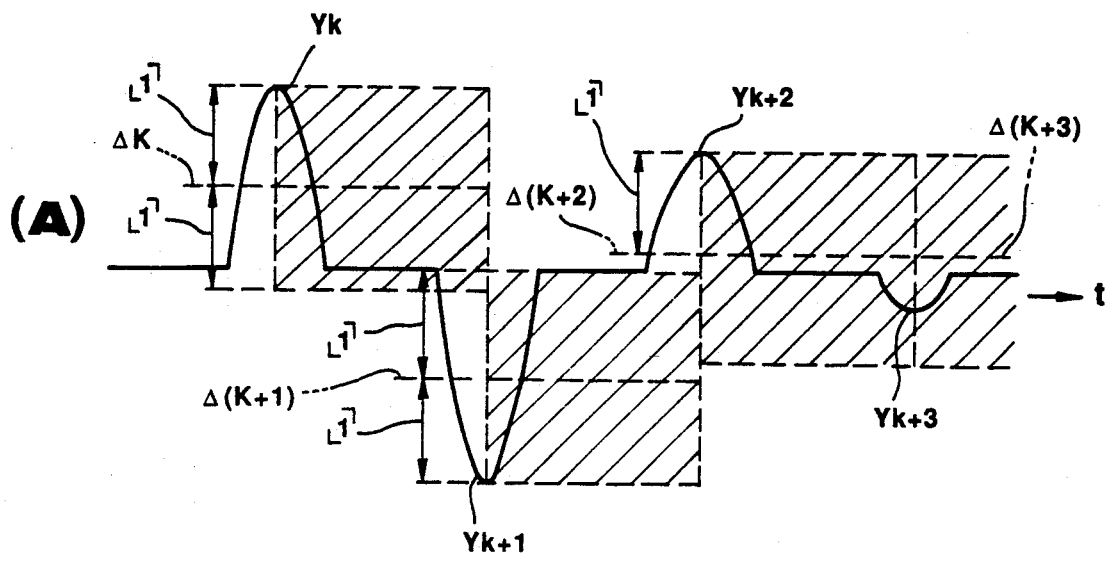
Figure 19:
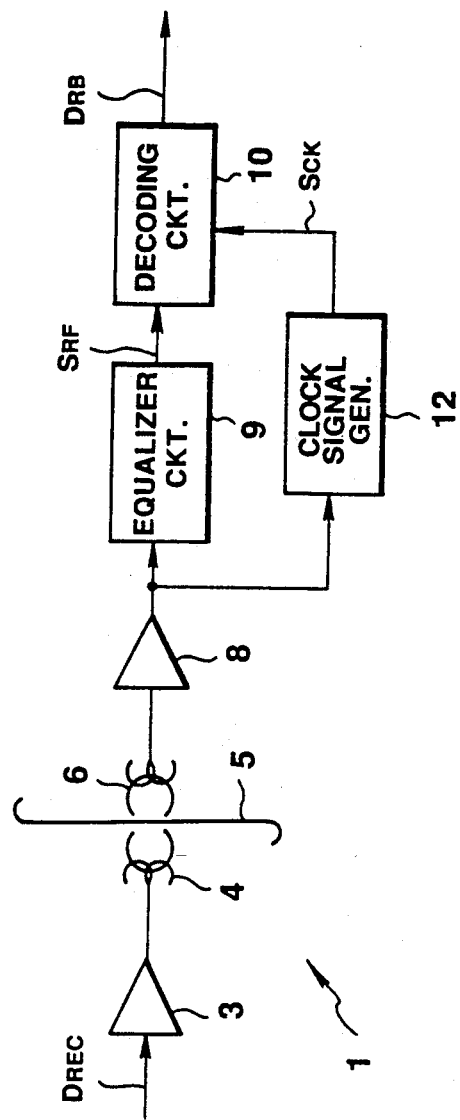
FIG. 19 is a block diagram showing the arrangement of a previously proposed video tape recorder arrangement.

When the recording signal $D_R$ which is divided between the odd and even lines is coded and the $(1-D)$ correlation between the Yk, YK+1 ... data is used, the bit error reduced reproduction data $D_{PB}$ can be decoded in accordance with the detected noise $S_N$ which has been previously added to the signal. The so called Furguson's Algorithm is used in such decoding process, and the effect of this process is illustrated in FIG. 13.

Figure 12:
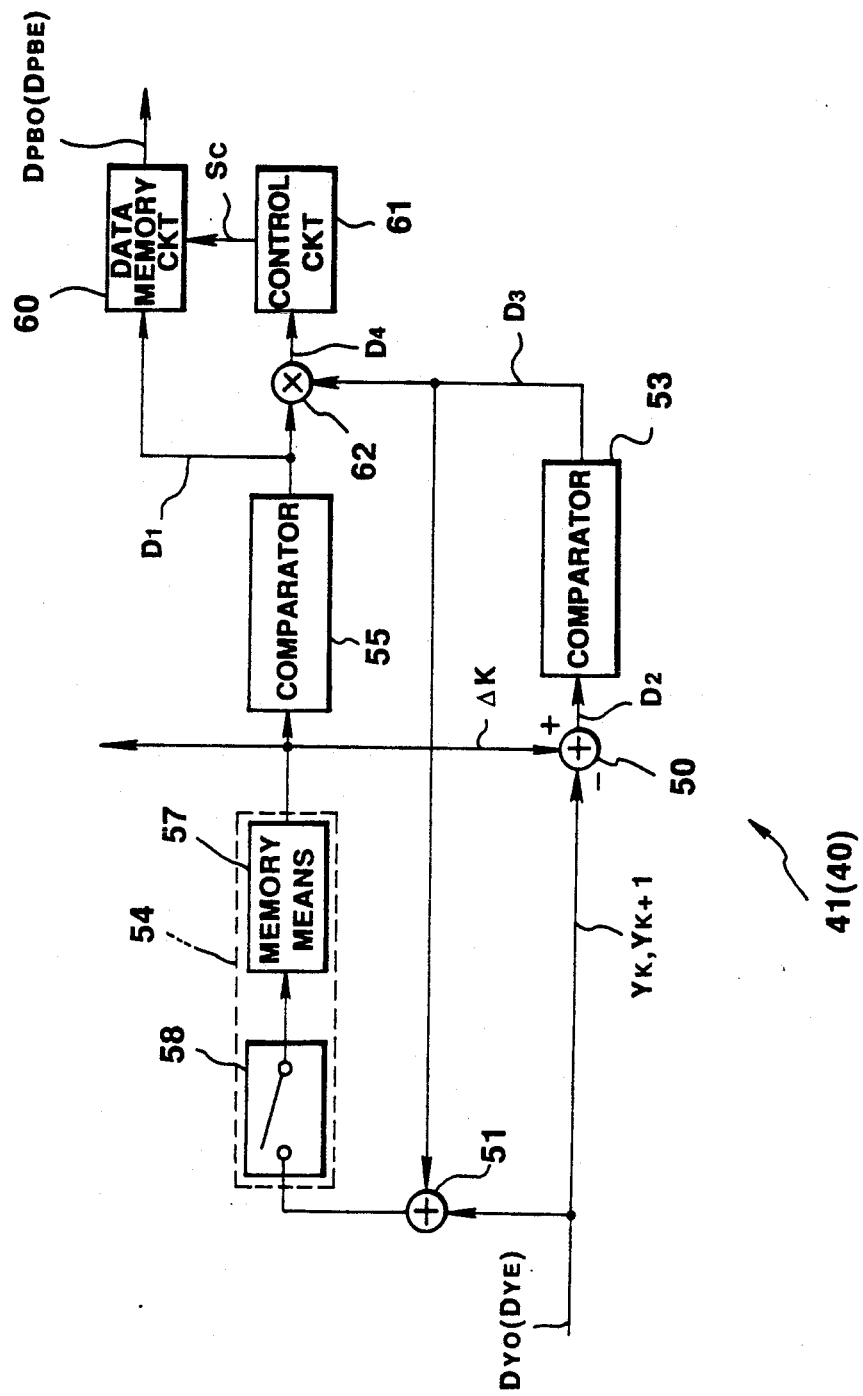
FIG. 12 is a block diagram showing the arrangement of a Viterbi decoding circuit in the first embodiment of the present invention.

As shown in FIG. 12, in the embodiment being presently described, each of the Viterbi decoding circuit 40 and 41 comprises adders 50 and 51, comparator circuits 53 and 55, a latch 54, a data memory circuit 60, a control circuit 61 and a multiplier 62, connected as shown.

The latch 54 includes a memory 57 and a switch 58. The output of the memory 57 is connected to the comparator 55 which receives ascertained data Δk therefrom and outputs decoding result data D1 (FIG. 13D) related to the input data Yk, when the switch 58 is closed.

The comparator 53 is arranged to output 1 and $-1$ value data D3 (FIG. 13B) when switch 58 is closed. The adder 51 receives the data D3 outputted by the comparator 53 and permits the Δk data to be renewed.

At this point, Δk is the metrollip difference above the trellis line (FIG. 13C) in each respective state. The reason for this is that the initial value of Δk is stored as 0 value data.

The comparator 53 is arranged to compare the data D2 (FIG. 13B) output from the adder 50, with $+/-1$ threshold levels and to convert the same into what shall be referred to as previously input data D3 having the values 1, 0, and $-1$. the output of comparator 53 is supplied to the multiplier 62 as well as to the adder 51.

The relationship between data Δk and the input data Yk+1 is given by the following equation:

$$\Delta k - Yk + 1 > 1 \tag{4}$$

When the previously input data D3 is set at a level of 1, the adder 51 outputs a signal Δ(k+1) in accordance with the following equation:

$$\Delta(k+1) = Yk + 1 + 1 \tag{5}$$

This value is stored in the memory 57 and thus renews the Δk data. In this connection the following relationship is established.

$$\Delta k - Yk + 1 < -1 \tag{6}$$

Accordingly, the data Δk which is stored in the memory 57 when D3 exhibits a $-1$ value, is such that $$\Delta(k+1) = Kk + 1 - 1 \tag{7}$$

and the Δk data is renewed.

Further, given that $$|\Delta k - Y_{k+1}| < 1 \qquad (8)$$

when D3 is set to 0, $\Delta k$ is given by $$\Delta(k+1) = \Delta k \qquad (9)$$

As conventional Viterbi circuits are used in the present embodiment and as the operation and underlying theory of the operation is well documented, further detailed disclosure of the same will be omitted for the sake of brevity. However, for further information reference may be had to:

1. The Viterbi Algorithm—an Invited Paper by G. David Forney, Jr.—published in PROCEEDINGS OF THE IEEE, VOL. 6 No. 3 Mar. 1973;
2. The Effects of Nonlinear Distortion on Class IV Partial Response by Paul Mewby and Roger Wood of the Ampex Corporation, Redwood city, Calif. - published in IEEE TRANSACTIONS ON MAGNETICS, Vol. Mag-22, No. 5 Sep. 1986; and
3. Application of Partial-response Channel Coding to Magnetic Recording Systems by H. Kobayashi and D. T. Tang—published in IMB J. RES. DEVELOP Jul. 1970.

The operation of the first described embodiment of the invention will be further explained below:

The video signal $S_V$ to be recorded is supplied to the A/D converter 22 and converted by the latter into a digital signal $D_V$. The digital signal data is compressed in the data compression circuit 24 to approximately 25 [Mbps] to form the compressed data signal $D_R$. This signal $D_R$ along with the audio signal $D_A$ are subject to shuffling and correction in the error correction circuit 26 so as to form recording data $D_{REC}$.

The recording data $D_{REC}$ is converted into precoded data $D_{PR}$ in the precode circuit 28 in accordance with equation (2). Then, the data $D_{PR}$ is divided into blocks to each of a 15 Mhz preamble $D_P$ is added in the adding circuit 29. Thus, when the blocks of the data $D_{PR}$ are recorded on the tape 5 by the heads 4A, 4B, the preamble recorded with each block can function as a reference signal.

In response to such reference signal, in the playback mode of the device 20, the magnetic heads 6A and 6B output a playback signal $S_R$ which is passed through the playback amplifier 8, the equalizer circuit 9, the variable gain amplifier 31 and the calculation processing circuit 32 to the A/D converter 37 for providing the data Yk. Following the division of the data Yk into the odd and even frequency number streams $D_{YO}$ and $D_{YE}$ by the switching circuit 39, the Viterbi circuits 41 and 40 decode the same and output data signals $D_{PBO}$ and $D_{PBE}$, respectively.

In response to the data Yk, data $\Delta k$ is renewed so that, when the output data Yk is "1", a comparison of $\Delta k$ with the first and second reference levels $D_{REF1}$ and $D_{REF2}$ is carried out. When the level of $\Delta k$ falls between $D_{REF1}$ and $D_{REF2}$, the analog signal which is produced in the D/A converter 72 is supplied through switch circuit 71 to the sample-hold capacitor 73. Thus when the $\Delta k$ data output of the Viterbi decoding circuit is "1" and falls between the reference levels $D_{REF1}$ and $D_{REF2}$, checking of the level of the playback signal $S_{RF}$ is induced. The gain of the variable gain amplifier 31 is varied depending on the voltage appearing on the sample-hold capacitor 73. The foregoing ensures that the level of signals $S_{RF}$, which are output by the variable gain amplifier 31, is maintained at a predetermined level.

Even when noise is mixed in with the signal $S_{RF}$ since the level thereof is held at a predetermined level, the bit error in signals $D_{PBO}$ and $D_{PBE}$ can be reduced.

At selection circuit 80, the signals $D_{PBO}$ and $D_{PBE}$ are recombined and supplied therefrom to error detection and correction circuit 81, data expansion circuit 82 and the D/A converter 83. The D/A converter 83 outputs a playback signal $S_{VPB}$ which is essentially identical to the original input signal $S_V$.

Further, a playback audio signal $S_{APB}$ is preferably obtained from detection and correction circuit 81.

Figure 20:
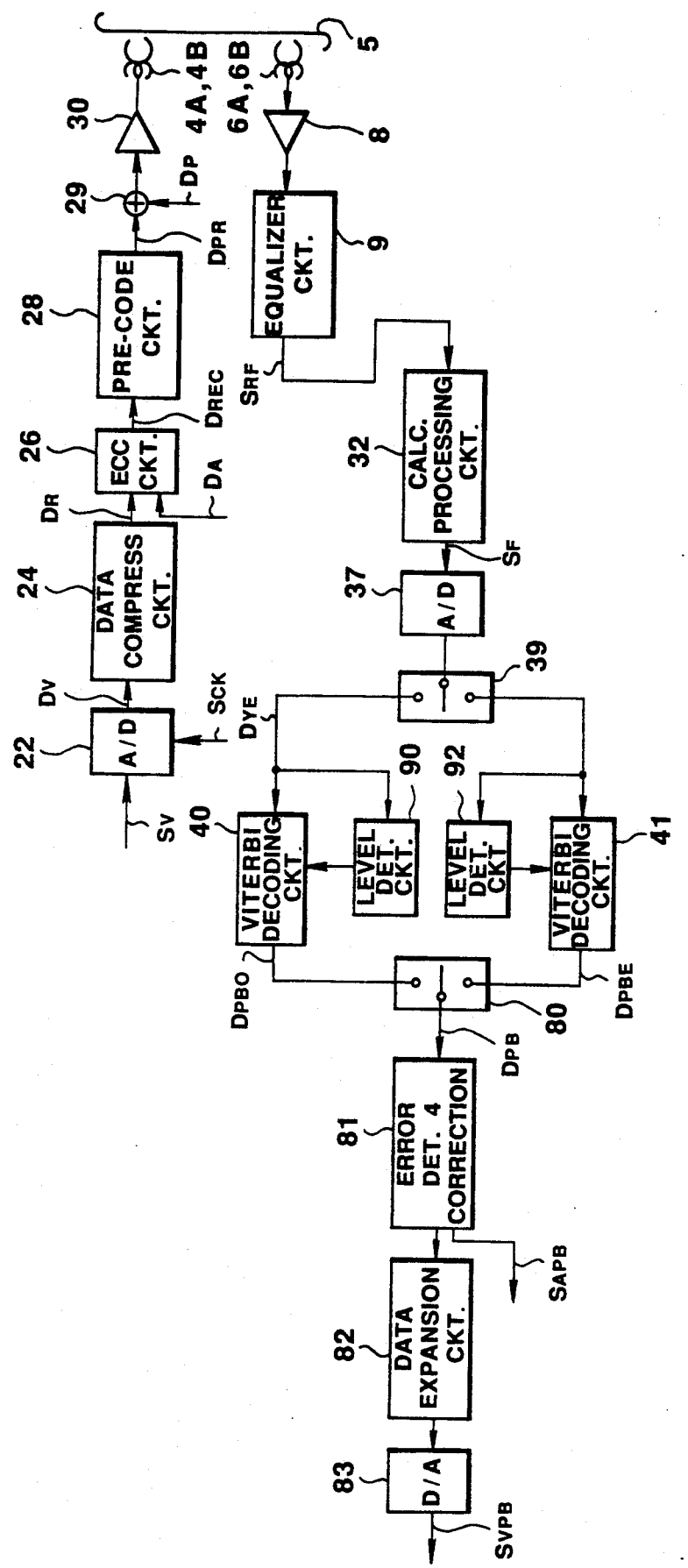
FIG. 20 is a block diagram similar to that of FIG. 1, but showing another embodiment of the present invention.

Referring now to FIG. 20, it will be seen that a recording and/or reproducing device 20' according to another embodiment of this invention is generally similar to the previously described device 20, but omits therefrom the variable gain amplifier 31, comparator 70, switch circuit 71, D/A converter 72 and sample-hold condenser or capacitor 73.

In place of the foregoing elements in the device 20, the device 20' is shown to have level detection circuits 90 and 92 associated with Viterbi circuits 40' and 41', respectively, and arranged to receive the signals $D_{YE}$ and $D_{YO}$, respectively, from the switching circuit 39.

Figure 21:
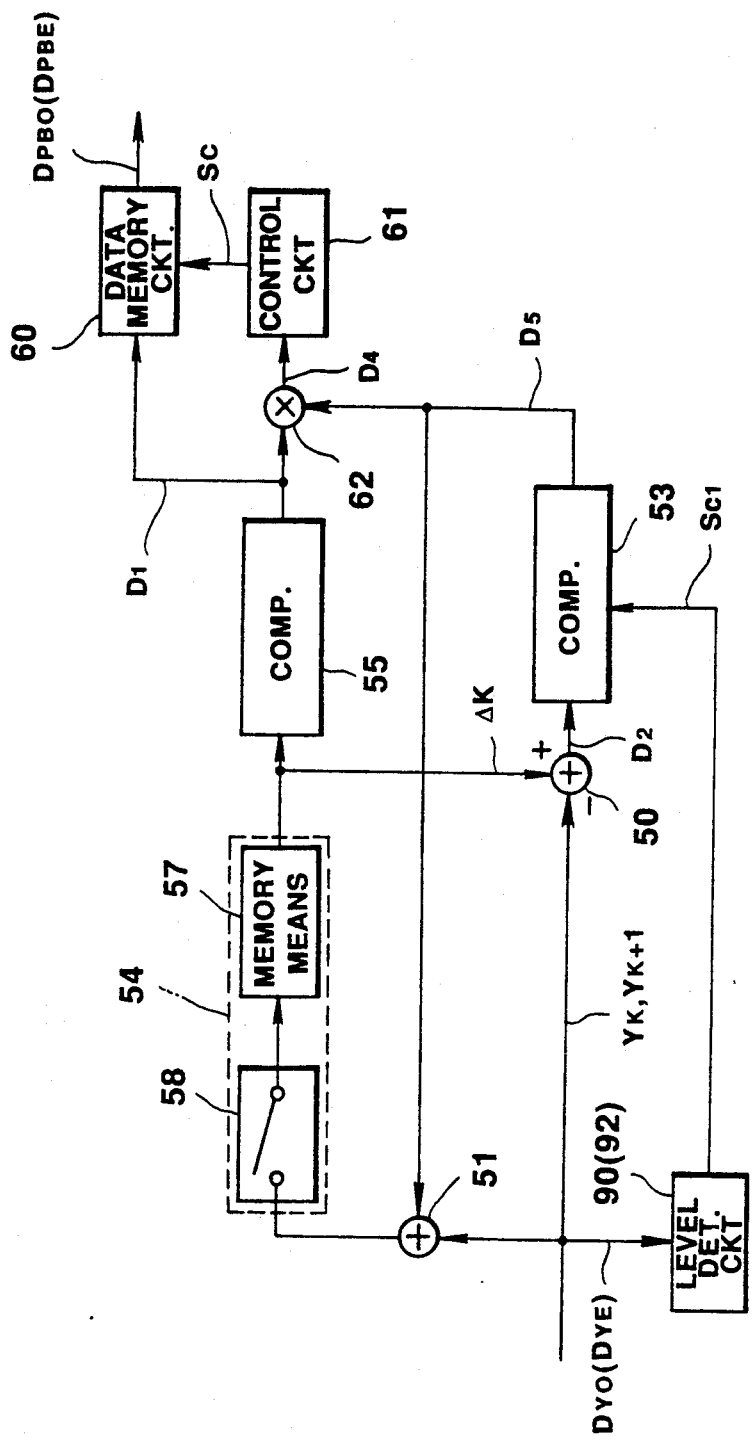
FIG. 21 is a block diagram similar to that of FIG. 12, but showing a circuit arrangement which characterizes the embodiment of FIG. 20.

As shown in FIG. 21, each of the level detection circuits 90 and 92 is arranged to receive the data $D_{YE}$ or $D_{YO}$ from the selection circuit 39 and to function as a comparator which compares the values of the leading and trailing edges of the data $D_{YE}$ or $D_{YO}$, respectively, with a predetermined standard level.

In the present embodiment, when the leading and trailing edge values of the data $D_{YE}$ or $D_{YO}$ exceed a value of 1.5, a detection signal SCI, indicating that the signal has assumed a high level, is issued to the comparator 53 in the respective one of the Viterbi decoding circuits 40' and 41'.

The comparator 53 of each of the Viterbi decoding circuits 40' and 41' is operatively connected with the respective level detection circuit 90 or 92, as aforesaid, so as to render variable the slice or decision level at which the comparator switches in response to the signal SCI. This enables signal D5 from the comparator 53 to be controlled for correspondingly controlling the output of the adder 51. Of course, the foregoing affects the output of the latch 54 and thus enables the $\Delta k$ data to be corrected.

Accordingly, the embodiment of FIG. 20 provides the same advantageous effects as the previously described embodiment.

Although the embodiment described with reference to FIG. 1 uses positive and negative direction references $D_{REF1}$ and $D_{REF2}$ to determine if the $\Delta k$ value is in the desired range, and controls the variable gain amplifier 31 in accordance with the error voltage or subject from the converter 72 only when $\Delta k$ is between $D_{REF1}$ and $D_{REF2}$, it is possible to directly control the gain of amplifier 31 by such error voltage.

Further, the voltage of the reference level which is used in the A/D converter 37 may be made variable and, following the A/D conversion, the level of the signal from the converter 37 may be held at a predetermined level in a manner which corrects the level of the playback signals.

Furthermore, it is to be noted that the present invention is not necessarily limited in its application to systems which use Class IV type partial response techniques and may find application to other types of video recording devices. Moreover, the present invention is not limited in its application to the recording of video signals on magnetic tape, and may be applied to other signals and other recording media.

Having specifically described preferred embodiments of the invention with reference to the accompanying drawings, it is to be understood that the invention is not limited to those embodiments or to the specifically mentioned modifications thereof, and that various changes and modifications may be effected therein by one skilled in the art without departing from the scope or spirit of the invention as defined in the appended claims.

What is claimed is:

1. Apparatus for recording and reproducing data signals, said apparatus comprising:
    means for precoding a digital data signal in accordance with a partial response technique so as to form a precoded data signal;
    means for recording said precoded data signal on a magnetic recording medium;
    means for reading the data recorded on said recording medium and for producing an analog playback signal corresponding thereto;
    processing means for processing said analog playback signal in accordance with a partial response technique so as to form a processed data signal;
    means for converting said processed data signal into a digital playback signal;
    signal dividing means for dividing said digital playback signal into first and second signal portions;
    first and second decoding means for respectively decoding said first and second signal portions in accordance with a Viterbi algorithm so as to respectively product first and second decoded signals;
    control means including level detection means for detecting a level of the signal supplied to the decoding means and generating a detection signal therefrom for controlling said first and second decoding means so as to reduce bit errors in said first and second decoded signals from said first and second decoding means, respectively; and
    signal re-combining means receiving said first and second decoded signals from said first and second decoding means for forming a recombined digital signal therefrom.

2. Apparatus for recording and reproducing data signals, said apparatus comprising:
    means for converting an input analog data signal to a digital data signal;
    means for precoding said digital data signal in accordance with a partial response technique so as to form a precoded data signal;
    means for recording said precoded data signal on a magnetic recording medium;
    means for reading the data recorded on said recording medium and for producing an analog playback signal corresponding thereto;
    processing means for processing said analog playback signal in accordance with a partial response technique so as to form a processed data signal;
    means for converting said processed data signal into a digital playback signal;
    signal dividing means for dividing said digital playback signal into first and second signal portions having respective signal levels;
    first and second decoding means for respectively decoding said first and second signal portions in accordance with a Viterbi algorithm so as to respectively produce first and second decoded signals;
    control means including first and second level detection means for respectively detecting the levels of said first and second signal portions and generating a detection signal therefrom for controlling said first and second decoding means so as to reduce bit errors in said first and second decoded signals from said first and second decoding means, respectively;
    signal re-combining means receiving said first and second decoded signals from said first and second decoding means for forming a recombined digital signal therefrom; and
    means for converting said recombined digital signal into an analog output signal.

3. The apparatus according to claim 2; wherein each of said first and second decoding means includes:
    an input terminal for receiving the respective one of said signal portions;
    first and second adders each coupled to said input terminal so as to receive the respective one of said signal portions;
    multiplier means;
    first and second comparator means each supplying a respective output signal to said multiplier means, said first comparator means receiving an output signal from the first adder, and the output signal from said first comparator means is further supplied to the second adder;
    latch means including a memory, a latch input for receiving an output signal from the second adder and a latch output for supplying an output signal therefrom to said second comparator means and said first adder;
    a control circuit for receiving an output signal from said multiplier means; and
    a data memory circuit for receiving the output signal from said second comparator means and an output signal from said control circuit.

4. The apparatus according to claim 3, wherein the detected signals from said first and second level detection means are respectively supplied to the first comparator means of the respective one of said first and second decoding means.

5. Apparatus for recording and reproducing data signals, said apparatus comprising:
    means for converting an input analog data signal to a digital data signal;
    means for precoding said digital data signal in accordance with a partial response technique so as to form a precoded data signal;
    means for recording said precoded data signal on a magnetic recording medium;
    means for reading the data recorded on said recording medium and for producing an analog playback signal corresponding thereto;
    means for converting said analog playback signal into a digital playback signal;
    signal dividing means for dividing said digital playback signal into first and second signal portions having respective signal levels;
    first and second decoding means for respectively receiving said first and second signal portions and for decoding said first and second signal portions in accordance with a Viterbi algorithm so as to respectively produce first and second decoded signals, said first and second decoding means further producing respective difference indicating data signals having respective signal levels which indicate differences between sequential values of the respective received first and second signal portions, each of said first and second decoding means including an input terminal for receiving the respective one of said signal portions, first and second adders each coupled to said input terminal so as to receive the respective one of said signal portions, multiplier means, first and second comparator means each supplying a respective output signal to said multiplier means in which said first comparator means receives an output signal from the first adder and the output signal from said first comparator means is further supplied to the second adder, latch means including a memory, latch input for receiving an output signal from the second adder and a latch output for supplying the respective difference indicating data signal therefrom to third comparator means, said second comparator means and said first adder, a control circuit for receiving an output signal from said multiplier means, and a data memory circuit for receiving the output signal from said second comparator means and an output signal from said control circuit;

level adjusting means including said third comparator means for comparing said difference indicating data signals with a reference value and variable gain amplifier means coupled between said means for reading the data and for producing an analog playback signal and said means for converting said analog playback signal, said variable gain amplifier means being operative to vary the levels of said first and second signal portions respectively received by said first and second decoding means in response to an output signal from said third comparator means so as to reduce bit errors in said first and second decoded signals from said first and second decoding means, respectively;

signal re-combining means receiving said first and second decoded signals from said first and second decoding means for forming a recombined digital signal therefrom; and means for converting said recombined digital signal into an analog output signal.

* * * * *